United States Patent
Nishikawa et al.

(10) Patent No.: US 7,755,813 B2
(45) Date of Patent: Jul. 13, 2010

(54) IMAGE READING APPARATUS

(75) Inventors: Hiroshi Nishikawa, Toyokawa (JP); Noritoshi Maruchi, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 873 days.

(21) Appl. No.: 11/642,889

(22) Filed: Dec. 21, 2006

(65) Prior Publication Data

US 2007/0201113 A1     Aug. 30, 2007

(30) Foreign Application Priority Data

Feb. 27, 2006  (JP) .............. 2006-051228
Feb. 27, 2006  (JP) .............. 2006-051229

(51) Int. Cl.
*H04N 1/04* (2006.01)
(52) U.S. Cl. ............... 358/497; 358/496; 358/474; 358/494
(58) Field of Classification Search ........... 358/497, 358/496, 474, 494, 463
See application file for complete search history.

(56) References Cited

FOREIGN PATENT DOCUMENTS

| JP | 61-150348 | 9/1986 |
|---|---|---|
| JP | 1-71753 | 5/1989 |
| JP | 8-202089 | 8/1996 |
| JP | 9-307695 | 11/1997 |
| JP | 10-210202 | 8/1998 |
| JP | 11-146140 | 5/1999 |
| JP | 2000-32218 | 1/2000 |
| JP | 2000-78357 | 3/2000 |
| JP | 2000-134409 | 5/2000 |
| JP | 2000-287017 | 10/2000 |
| JP | 2000-287031 | 10/2000 |
| JP | 2001-63105 | 3/2001 |
| JP | 2001-66713 | 3/2001 |
| JP | 2001-83748 | 3/2001 |
| JP | 2001-154422 | 6/2001 |
| JP | 2001-223832 | 8/2001 |
| JP | 2001-296620 | 10/2001 |
| JP | 2002-51191 | 2/2002 |
| JP | 2002-190927 | 7/2002 |
| JP | 2002-320075 A | 10/2002 |
| JP | 2002-365742 A | 12/2002 |

(Continued)

OTHER PUBLICATIONS

Japanese Notification of Reasons for Refusal mailed Nov. 4, 2009, directed to counterpart Japanese Patent Application No. 2006-051228; 13 pages.

(Continued)

*Primary Examiner*—Houshang Safaipour
(74) *Attorney, Agent, or Firm*—Morrison & Foerster LLP

(57) ABSTRACT

An image reading apparatus which reads a document image optically at a reading position while feeding the document over a reading glass. A document guide sheet for forming a step so as to prevent an imaged surface of a fed document from coming into contact with the reading glass is provided at an upstream side of the reading position with respect to a document feeding direction. The reading glass is capable of reciprocating in the document feeding direction by a specified distance $x2$. If the document guide sheet is located such that a downstream edge of the document guide sheet is at a distance $x1$ from the reading position, the distances $x1$ and $x2$ are in relationship of $x1 < x2$.

17 Claims, 18 Drawing Sheets

FOREIGN PATENT DOCUMENTS

| | | |
|---|---|---|
| JP | 2003-8852 | 1/2003 |
| JP | 2003-60853 | 2/2003 |
| JP | 2003-189060 | 7/2003 |
| JP | 2003-259096 | 9/2003 |
| JP | 2003-298810 A | 10/2003 |
| JP | 2004-32545 | 1/2004 |
| JP | 2004-48184 | 2/2004 |
| JP | 2004-236252 | 8/2004 |
| JP | 2004-289512 | 10/2004 |
| JP | 2005-80126 | 3/2005 |
| JP | 2005-210624 A | 8/2005 |
| JP | 2005-260548 A | 9/2005 |
| JP | 2005-286586 | * 10/2005 |

OTHER PUBLICATIONS

Japanese Notification of Reasons for Refusal mailed Nov. 4, 2009, directed to counterpart Japanese Patent Application No. 2006-051229; 16 pages.

Japanese Office Action mailed on Feb. 17, 2009 directed at counterpart application No. 2006-051228; 10 pages.

Japanese Notification of Reasons for Refusal mailed Jul. 7, 2009, directed to counterpart Japanese Patent Application No. 2006-051229; 13 pages.

Japanese Office Action mailed on Sep. 24, 2008, directed towards foreign application No. 2006-051228; 9 pages.

Chinese Office Action mailed on Aug. 8, 2008 directed towards foreign application No. 200710002068.3; 8 pages.

* cited by examiner

FIG. 5
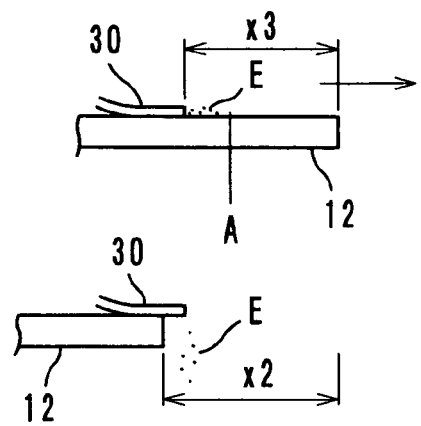
FIG. 6a    FIG. 6c
  FIG. 6b    FIG. 6d
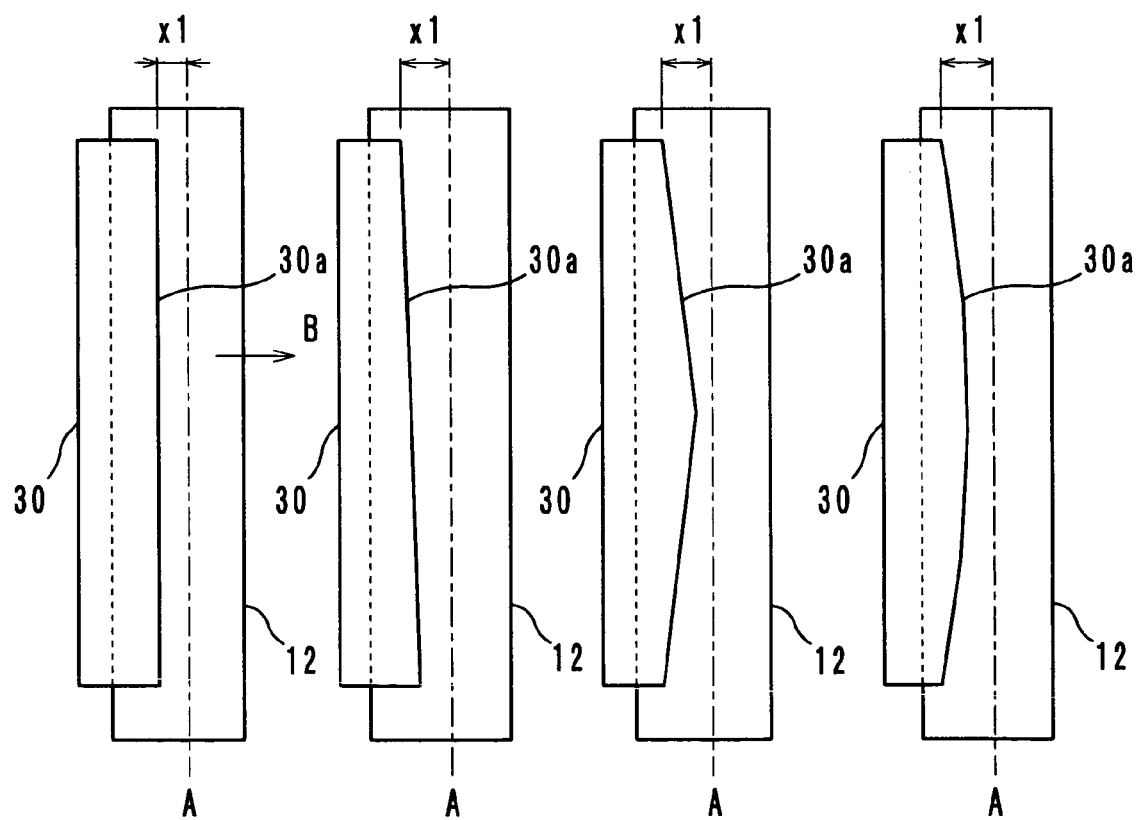

F I G. 1 0
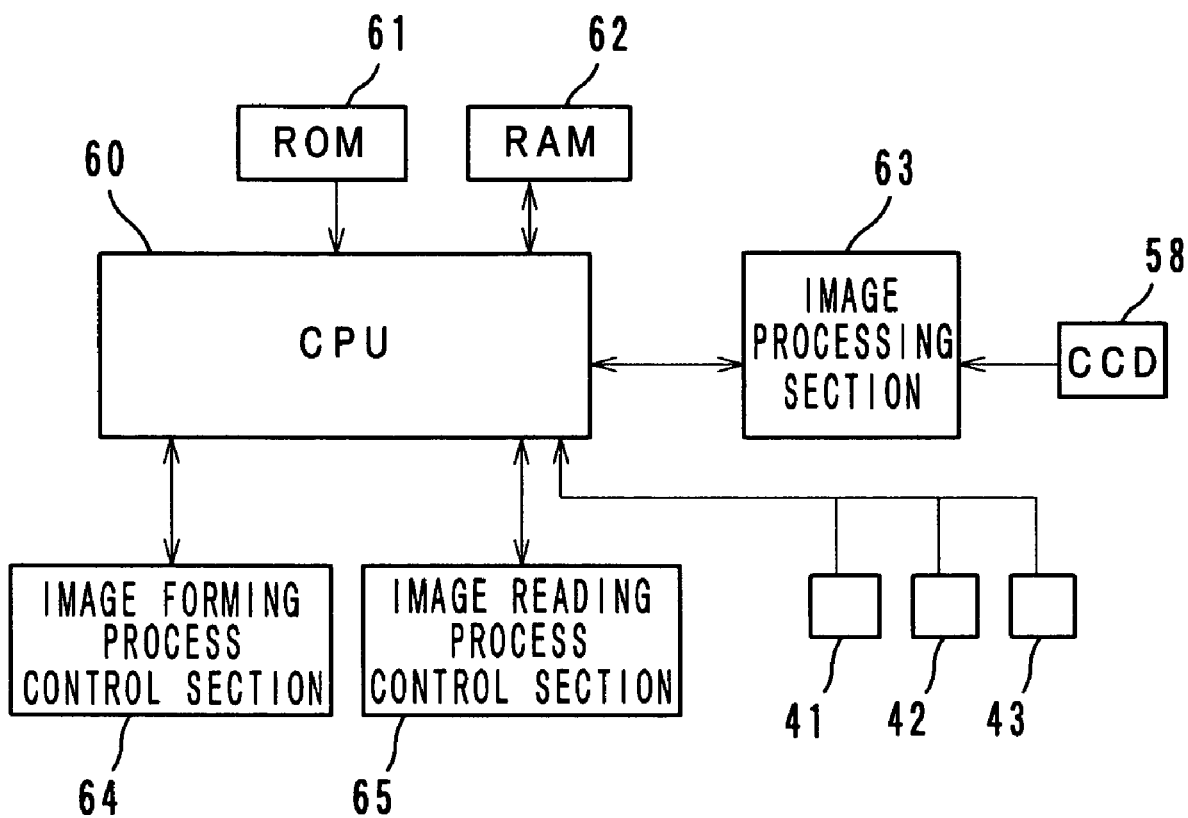

IMAGE READING APPARATUS

This application is based on Japanese Patent Applications No. 2006-051228 and No. 2006-051229 filed on Feb. 27, 2006, the contents of which are incorporated herewith by reference.

BACKGROUND OF THE INVENTION

1. Field of the Invention

The present invention relates to an image reading apparatus, and more particularly to a document feeding type image reading apparatus which is suited to be used as an image input device for a copying machine and a scanner.

2. Description of Related Art

In the art of image reading apparatuses for reading images optically, a platen-set method wherein an image of a document set on a platen glass is read and a sheet-through method wherein an image of a document is read while the document is being fed are adopted separately or at the same time. The sheet-through method is advantageous in its small size, low cost, low noise, high-speed image reading and high printing efficiency. Therefore, the sheet-through method is generally adopted for monochromatic copying machines, and it is demanded that the sheet-through method be adopted for color copying machines also.

In the sheet-through method, an image reading position is fixed on a transparent member (a strip of reading glass), and a reading optical system is designed to have a focus on an imaged-surface of a document fed over the reading glass. Therefore, image reading is apt to be influenced by foreign matters such as dust adhering to the reading glass, and portions shaded by the foreign matters are read as image noise, that is, stripes.

The foreign matters stuck on the reading glass are generally sticky matters, such as gluey cracks of an adhesive tape or glue, correction liquid, inkblots and eraser rubbish which peeled off from documents, and these foreign matters are apt to stick to the portion of the reading glass where documents are pressed against. These sticky foreign matters do not come off the reading glass easily and cause image noise. Also, floating matters, such as paper rubbish dispersed from documents and dust in the air, are deposited on the reading glass, which causes image noise. In the sheet-through method, in feeding a document, the document is nipped between rollers and is pressed by guide plates. Therefore, the document, which is generally made of paper, has a stress, and necessarily, paper dust falls down from the document.

In order to avoid this trouble, Japanese Patent Laid-Open Publications No. 9-307695 (Reference 1) and No. 11-146140 (Reference 2) suggest that a step be made in a position upstream of the reading glass in a document feeding direction so that a document can be fed without being in contact with the reading glass. In this non-contact method, adherence of sticky foreign matters to the reading glass can be prevented. On the other hand, floating foreign matters are dragged into a traveling document when the document comes into contact with the reading glass and are ejected naturally. In the non-contact method, the trailing portion of a traveling document comes into contact with the reading glass because the trailing portion is no longer supported after having passed the step, and floating foreign matters may be dragged into the trailing portion of the document and may be ejected.

In the non-contact method, however, the trailing portion of the document which comes into contact with the reading glass is a small area, and it is difficult to certainly remove floating foreign matters from the periphery of the reading glass. A document is apt to have a curl and/or wrinkles in its trailing portion, and the trailing portion may not be flat. Therefore, the trailing portion of a document does not necessarily come into contact with the reading glass, and floating foreign matters which cannot be removed are deposited on the reading glass.

Japanese Patent Laid-Open Publication No. 2001-223832 (Reference 3) suggests an improvement on the apparatus disclosed by Reference 1. Reference 3 suggests that a catcher member for catching foreign matters be provided between the step and the reading glass. In this structure, troublesome maintenance (changes and cleaning) of the catcher member is necessary. Also, the catcher member cannot be located at the reading position, and it is impossible to catch dust which has fallen onto the reading position.

Regarding a monochromatic reading apparatus, the reproducibility of letters is regarded to be important, and image processing for clear reproduction of letters is carried out by heightening the reproducibility of high-density portions, such as letters, and by lowering the reproducibility of low-density portions. Therefore, in images formed by the monochromatic reading apparatus, image noise due to very small floating foreign matters such as paper dust is not very apparent. Regarding a color image reading apparatus, on the other hand, reading of gradation of a document is regarded to be important because it is important to reproduce the gradation of a photo or the like. Therefore, very small floating foreign matters, which do not become apparent in the monochromatic reading apparatus, are also read, and consequently, noise appears on a reproduced image as narrow stripes.

SUMMARY OF THE INVENTION

An object of the present invention is to provide a sheet-through type image reading apparatus wherein adherence of sticky foreign matters to a transparent member for reading an image of a traveling document is prevented, wherein floating foreign matters can be removed and wherein noise stripes are prevented from appearing on a reproduced image.

In order to attain the object, an image reading apparatus according to the present invention comprises: an automatic document feeder for feeding documents one by one so that each document passes through a reading position; an image reading unit for reading an image of each of the documents traveling through the reading position; a transparent member provided between the document traveling through the reading position and the image reading unit; a document guide member, with a specified thickness, provided on the transparent member in an upstream side of the reading position; and a mechanism for reciprocating either the transparent member or the document guide member substantially in parallel to a document feeding direction while the document guide member is in contact with the transparent member. In the image reading apparatus, if a downstream edge with respect to the document feeding direction of the document guide member is at a distance x1 from the reading position and if the document guide member or the transparent member is moved by a distance x2 relative to each other, the distances x1 and x2 are in relationship of x1<x2.

In the image reading apparatus according to the present invention, a document travels over the transparent member while being out of contact with the transparent member due to the document guide member. Thereby, it can be prevented that sticky foreign matters are transferred from the document to the transparent member. Further, either the transparent member or the document guide member is reciprocated substantially in parallel to the document feeding direction by a distance x2 larger than the distance x1 between the downstream edge of the document guide member and the reading position, so that foreign matters deposited on the reading position can be removed therefrom. Thus, there is no fear that striped noise may appear on a reproduced image.

In the image reading apparatus, the transparent member and the document guide member are in contact with each other at least from a time when the travel distance x2 becomes equal to x1 to a time when a forward movement by the distance x2 completes. In other words, the transparent member and the document guide member come into contact with each other at the latest when the downstream edge of the document guide member reaches the reading position and keep in contact with each other until a forward movement by the distance x2 completes, so that the downstream edge of the document guide member can push foreign matters deposited on the reading position away therefrom. Alternatively, if the downstream edge of the document guide member is at a distance x3 from a downstream edge with respect to the document feeding direction of the transparent member, the distances x2 and x3 may be in relationship of x2≧x3. In this case, foreign matters deposited on the reading position can be removed completely from the transparent member.

The document guide member may be in contact with the transparent member at all times. Alternatively, the document guide member may be structured to be out of contact with the transparent member during document feeding and to come into contact with each other for cleaning of the transparent member.

Further, the image reading apparatus may comprise a sheet-like member which is structured integrally with the document guide member and which is in contact with a reverse side of the transparent member. This enables cleaning of the reverse side of the transparent member. The downstream edge with respect to the document feeding direction of the document guide member may be of a shape changing gradually in a plan view. More specifically, the downstream edge with respect to the document feeding direction of the document guide member does not necessarily have to be straight in the perpendicular direction of the sheet feeding direction, and may be skew at a small angle to the document feeding direction and may be an arc.

The image reading apparatus further comprises an input member for inputting a job to be performed by the image reading unit; a sensor for detecting that the automatic document feeder is in a closed position to cover the transparent member; and a control section for actuating the mechanism to move either the transparent member or the document guide member while the sensor detects that the automatic document feeder is in the closed position. Thus, cleaning of the transparent member is performed when the automatic document feeder is in the closed position.

The cleaning may be performed at any proper timing. For example, the cleaning may be performed before start of an input job or completion of an input job. Also, the cleaning may be performed when the automatic document feeder comes from an open position to uncover the transparent member to the closed position, when the power switch is turned on, when a paper jam in the automatic document feeder is solved, or when the image reading unit is making shading correction.

During continuous feeding of a plural number of documents, the cleaning may be performed between a time when a trailing portion of a foregoing document passes by the reading position and a time when a leading portion of a next document passes by the reading position. The cleaning may be started before the trailing edge of the foregoing document passes by the reading position. More specifically, the cleaning may be started when a starting point of the trailing edge portion, which is not subjected to image reading, of the foregoing document comes to the reading position.

BRIEF DESCRIPTION OF THE DRAWINGS

This and other objects and features of the invention will be apparent from the following description with reference to the accompanying drawings, in which:

FIG. 5 is an illustration showing another exemplary travel distance of the reading glass;

FIGS. 6a, 6b, 6c and 6d are plan views showing exemplary shapes of a downstream edge of the document guide sheet;

FIG. 10 is a block diagram showing a control section of a copying machine including the image reading apparatus;

DETAILED DESCRIPTION OF THE PREFERRED EMBODIMENTS

Embodiments of an image reading apparatus according to the present invention are described with reference to the accompanying drawings. In the embodiments below, same parts and same members are referenced with same reference marks, and repeated descriptions are omitted.

Image Reading Apparatus; See FIGS. 1-6

Figure 1:
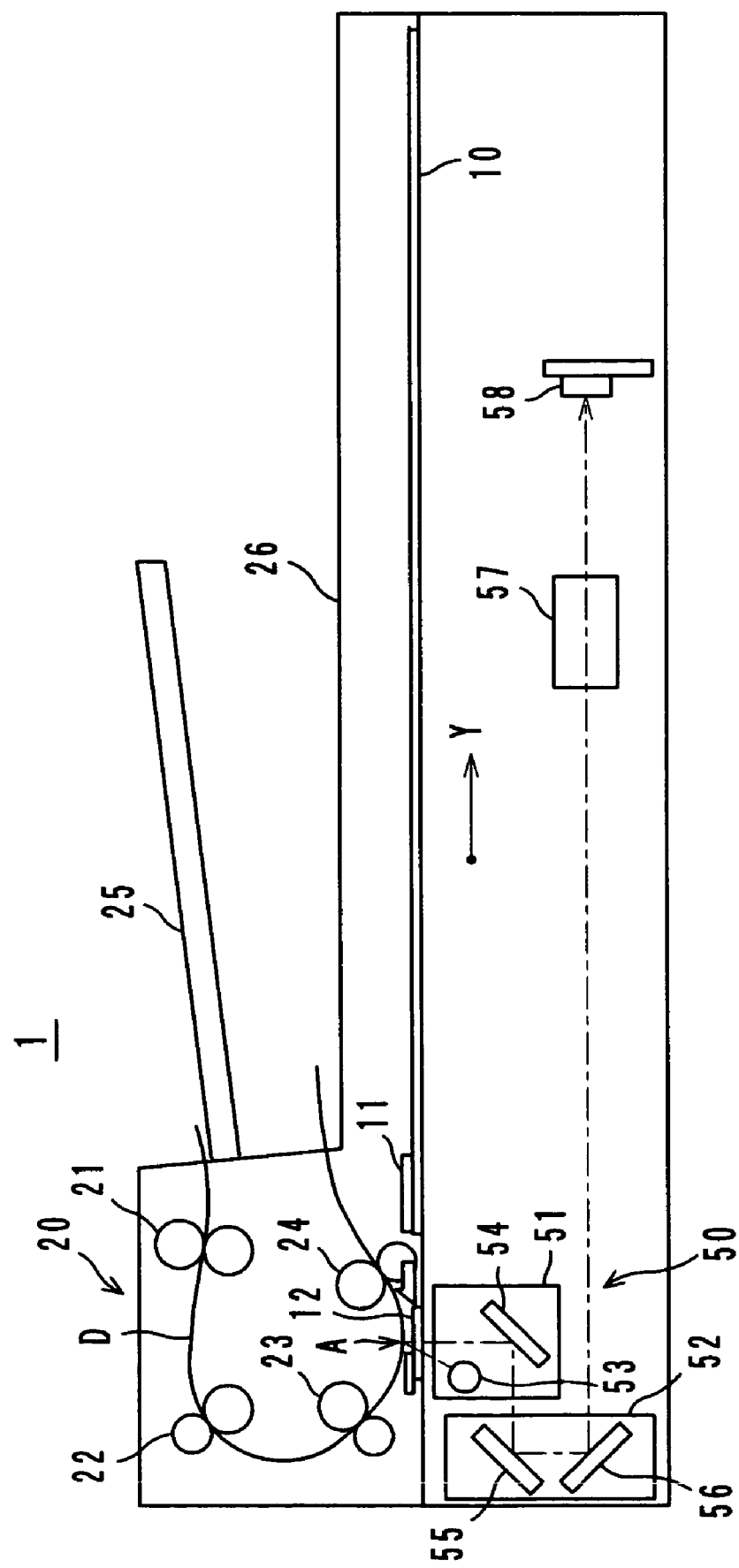
FIG. 1 is a schematic view of an image reading apparatus according to the present invention.

FIG. 1 shows an image reading apparatus 1 according to an embodiment of the present invention. The image reading apparatus 1 adopts both a platen-set method wherein an image of a document (not shown) set on a platen glass 10 is read and a sheet-through method wherein an image of a document D fed by an automatic document feeder 20 is read, and an image reading optical system (a scanner) 50 is provided.

Image reading by the platen-set method is carried out as follows: a document set on the platen glass 10 is irradiated by a lamp 53, for example, a rare gas fluorescent lamp; light reflected by the document is further reflected by mirrors 54, 55 and 56, and then enters to an imaging lens 57; and the light is imaged on an image pick-up section (a CCD color line sensor) 58. The lamp 53 and the mirror 54 are mounted on a first slider 51, and the mirrors 55 and 56 are mounted on a second slider 52. The first slider 51 and the second slider 52 are movable in a sub-scanning direction Y. On the platen glass 10, at an upstream side in the sub-scanning direction Y, a white reference plate 11 for shading correction is provided.

The automatic document feeder 20 has a plural number of roller pairs 21, 22, 23 and 24. Documents D are picked up from a tray 25 one by one, and each document passes through the roller pairs 21, 22 and 23 and is fed onto a reading glass 12. An image of the document D is read by the image reading optical system 50 set immediately under a reading position A. Then, the document D passes through the roller pairs 24 and is ejected onto a tray 26.

Image data read out by the image reading optical system 50 are sent to an image processing section 63 (see FIG. 10) and are further sent to a laser scanning unit (not shown) of a digital copying machine. Then, an image is formed on a paper by a conventional electrophotographic method. This image reading process by the platen-set method, an image reading process by the sheet-through method and an image forming process by the electrophotographic method are well known, and detailed descriptions thereof are omitted.

Figure 2:
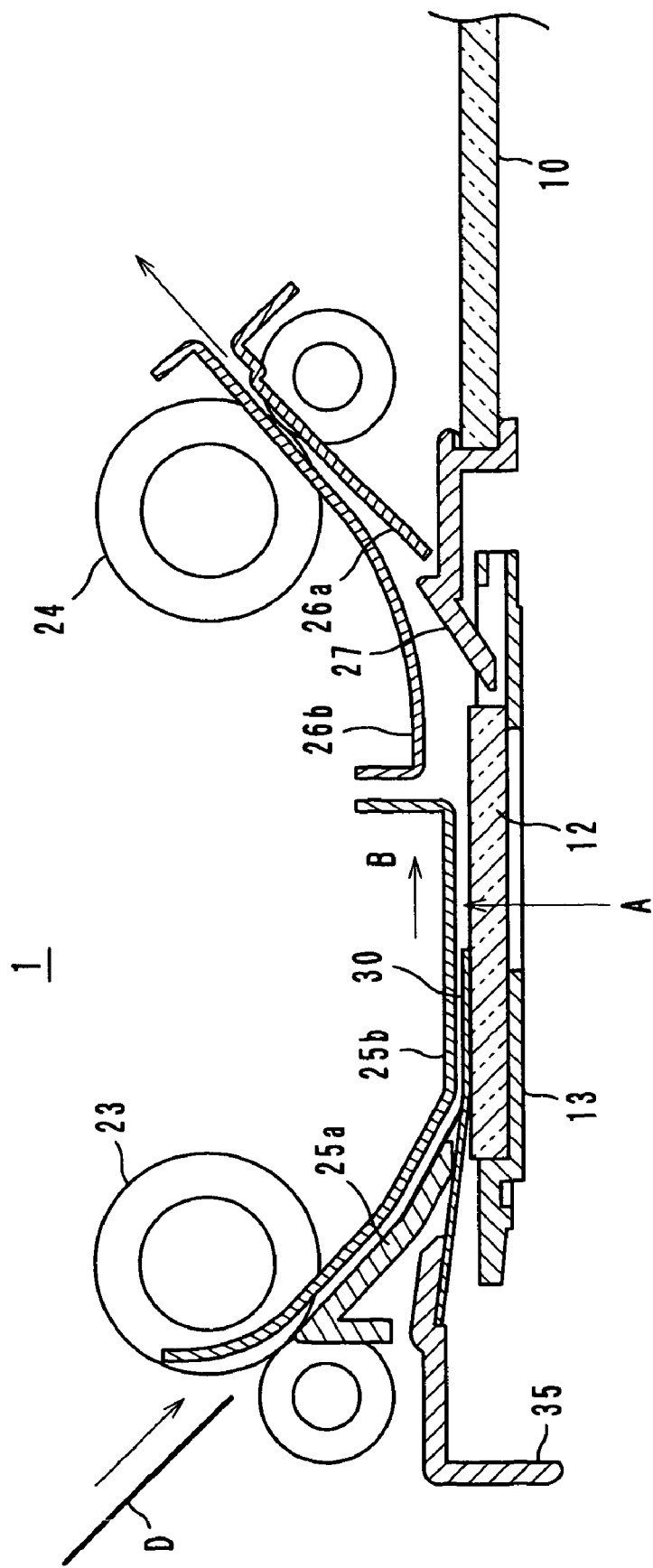
FIG. 2 is a magnified view of an essential part of the image reading apparatus shown by FIG. 1.

FIG. 2 is a magnified sectional view of an image reading section by the sheet-through method. In the periphery of the reading glass 12, document guide plates 25a, 25b, 26a and 26b, and a pick-up plate 27 for picking up a document passing through the image reading position A are provided. Further, at an upstream side of the reading position A with respect to a document feeding direction B, a document guide sheet 30 bonded to a mounting plate 35 is in contact with an upper surface of the reading glass 12 so that a traveling document will not come into contact with the reading glass 12.

In the image reading apparatus 1, with rotation of the roller pairs 23 and 24, a document is fed to right sliding on an upper surface of the guide sheet 30, and the document passing by the reading position A keeps out of contact with the reading glass 12 because of the thickness of the guide sheet 30. In the meantime, the document image is read by the reading optical system 50 via the reading glass 12. Since there is a space between the document and the reading glass 12, sticky foreign matters, such as ink corrector, will not stick to the reading glass 12.

Figure 3:
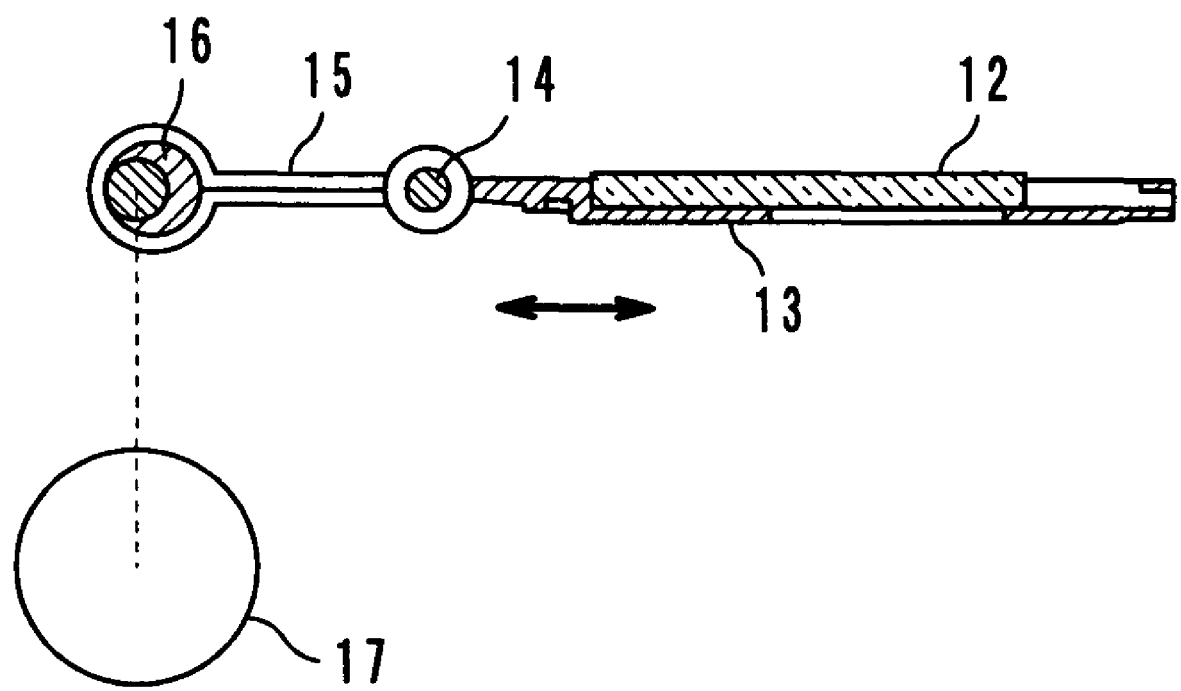
FIG. 3 is a sectional view of a mechanism for moving a reading glass.

The reading glass 12 is supported by a support 13. As FIG. 3 shows, a shaft 14 of the support 13 is connected to a crank arm 15, and by rotating a driving motor (a stepping motor) 17 to make one rotation of an eccentric cam 16, the crank arm 15 reciprocates in parallel to the document feeding direction B. The travel distance of the reading glass 12 can be adjusted by controlling the number of driving pulses of the driving motor 17. The time of moving the reading glass 12 will be described later.

The document guide sheet 30 has a thickness of 0.65 mm, that is, a step made by the guide sheet 30 has a height of 0.65 mm. The guide sheet 30 is made of a material with a low sliding resistance. (preferably, with a coefficient of friction not more than 0.3), such as extra-high molecular weight polyethylene. By using a material with a low sliding resistance, the load on the reading glass 12 during the movement of the reading glass 12 is small, and trouble such as occurrence of noise can be avoided.

The document guide plate 25b is to correct the posture of the document D. For stable image reading, the space between the reading glass 12 and the document D is designed to be 1.2 mm. If the space becomes larger than 1.4 mm, the posture of the document is not stable, and smooth feeding of the document is impossible. Accordingly, the density of a read image becomes uneven.

In the image reading apparatus 1, a document is fed over the reading glass 12 without coming into contact with the reading glass 12, and therefore, there is no fear that sticky foreign matters may be transferred from the document to the reading glass 12. Meanwhile, floating foreign matters, such as paper dust falling from the document, come down to the reading glass 12, and most of the foreign matters are dragged into the traveling document and are ejected from the reading glass 12. However, several percentages of floating foreign matters, such as paper dust and dust in the air, as shown by the mark "E" in FIG. 4a, are left on the reading glass 12, in the area from a downstream edge with respect to the document feeding direction B of the guide sheet 30 to the reading position A.

In order to solve this problem, in the image reading apparatus 1, the reading glass 12 is reciprocated by the driving motor 17 and the eccentric cam 16, so that the foreign matters E are pushed by the downstream edge of the document guide sheet 30 away from the reading position A. Thereby, striped image noise can be prevented from appearing on a reproduced image. The travel distance x2 of the reading glass 12 by the eccentric cam 16 is designed to be larger than the distance x1 between the downstream edge of the guide sheet 30 and the reading position A. The guide sheet 30 is long in a direction perpendicular to the sheet feeding direction B, and the downstream edge of the guide sheet 30 is evenly in contact with the reading glass 12. Therefore, the foreign matters E can be certainly ejected from the reading position A. In this embodiment, specifically, the distance x1 is 6 mm, and the distance x2 is 10 mm.

Figure 4A:
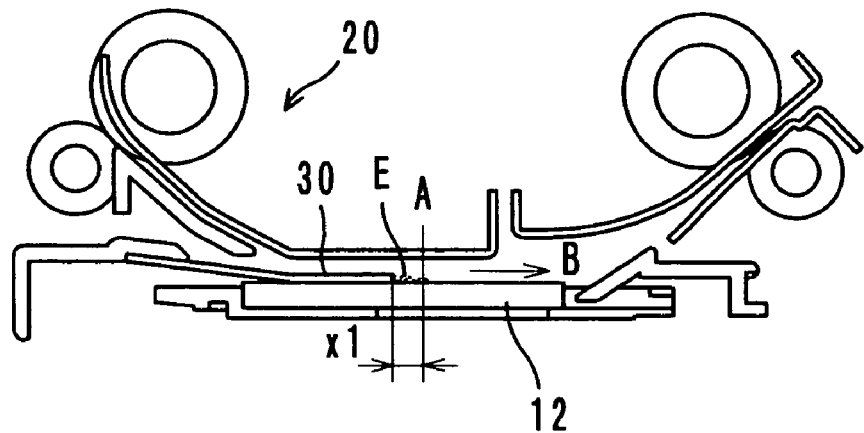
FIGS. 4a, 4b and 4c are illustrations showing cleaning of the reading glass by a document guide sheet.
Figure 4B:
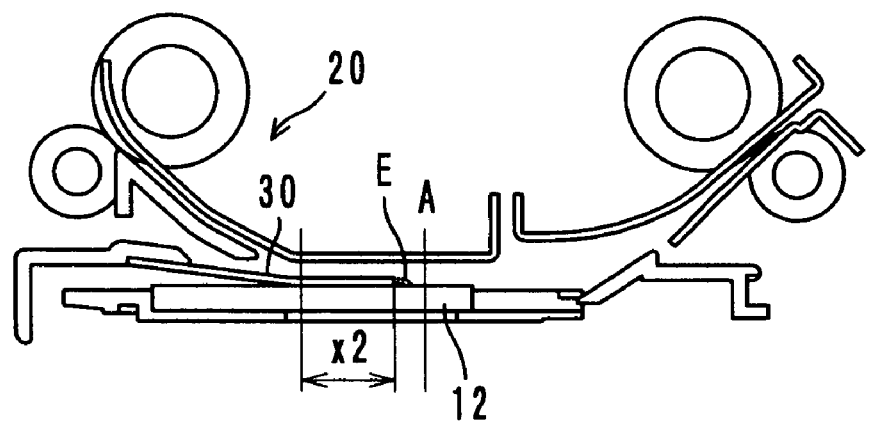
Figure 4C:
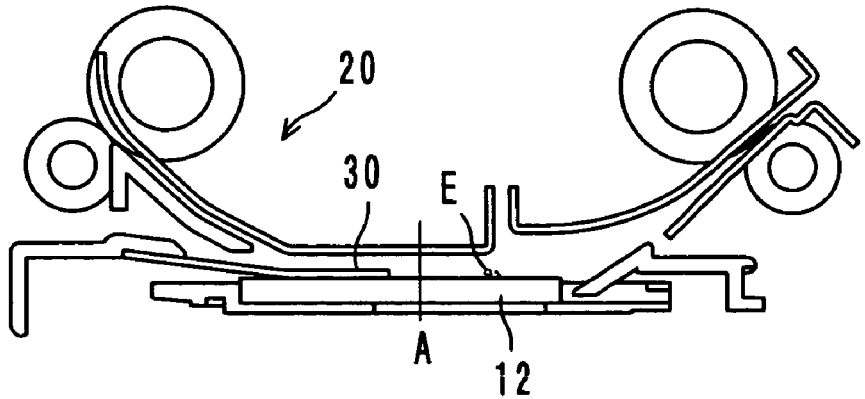

First, as FIG. 4a shows, the reading glass 12, which have foreign matters E thereon, is moved from a home position in a direction reverse to the document feeding direction B by the distance x2 (10 mm) (see FIG. 4b). Thereby, the foreign matters E are raked away from the reading position A. Then, when the reading glass 12 is returned to the home position, the reading position A has been cleaned up (see FIG. 4c). Because the foreign matters E, which were floating in the air, are not sticky to the reading glass 12, the foreign matters E can be removed by the downstream edge of the guide sheet 30 easily. Also, because the guide sheet 30 is made of a material with a low sliding resistance, there is no fear that the reading glass 12 may be scarred with the guide sheet 30.

As FIG. 5 shows, the travel distance x2 of the reading glass 12 may be designed to be larger than the distance x3 between the downstream edge of the guide sheet 30 and a downstream edge with respect to the document feeding direction B of the reading glass 12. In this case, by reciprocating the reading glass 12 by the distance x2, the foreign matters E are pushed over the downstream edge of the reading glass 12, and consequently, the foreign matters E can be ejected from the reading glass 12 completely.

Although a structure for moving the reading glass 12 has been described above, a structure for reciprocating the document guide sheet 30 while fixing the reading glass 12 is also possible. The mechanism for moving the reading glass 12 or the document guide sheet 30 can be realized by combining any conventional mechanisms.

The downstream edge of the document guide sheet 30 may be of any shape, with respect to the plan view. As FIG. 6a shows, the downstream edge 30a of the guide sheet 30 is usually designed to be straight in the direction perpendicular to the document feeding direction B. However, the downstream edge 30a of the guide sheet 30 may be designed to change gradually. For example, the downstream edge 30a may be skew as shown by FIG. 6b, may be skew with the center as a border as shown by FIG. 6c, and may be an arc as shown by FIG. 6d.

Whatever the shape of the downstream edge 30a of the guide sheet 30 is, the distance x1 from the reading position A is the distance between the most upstream point of the downstream edge 30a of the guide sheet 30 and the reading position A.

Another Type of Document Guide Sheet: See FIGS. 7a, 7b and 7c

Figure 7A:
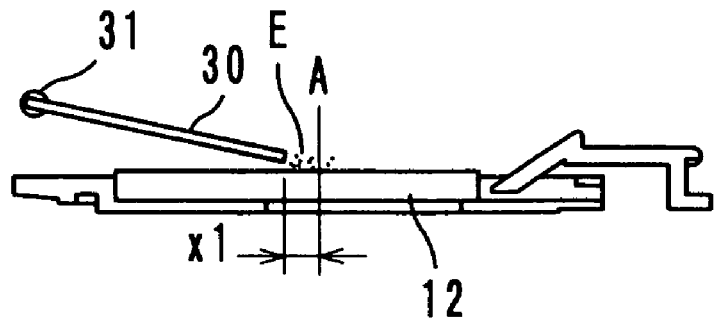
FIGS. 7a, 7b and 7c are illustrations showing cleaning of the reading glass by other exemplary document guide sheets.
Figure 7B:
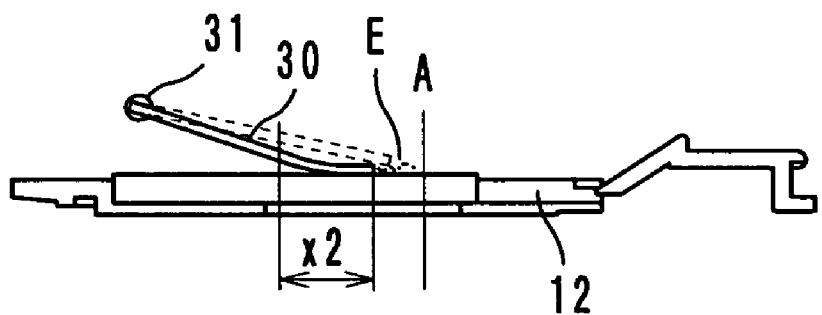
Figure 7C:
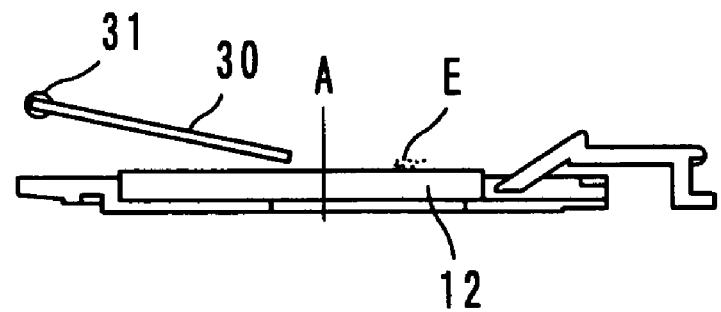

As FIGS. 7a, 7b and 7c show, the document guide sheet 30 may be capable of pivoting up and down on a shaft 31. With the pivot of the guide sheet 30, the downstream edge of the guide sheet 30 comes into contact with and goes away from the reading glass 12. The document guide sheet 30 is fitted to a frame of the automatic document feeder 20 via the shaft 31.

While the downstream edge of the guide sheet 30 keeps away from the reading glass 12, the guide sheet 30 guides a document in the document feeding direction B (see FIG. 7a). In order to remove foreign matters E, the guide sheet 30 pivots down and comes into contact with the reading glass 12, and in this state, the reading glass 12 moves from the home position by the distance x2 (see FIG. 7b). Thereafter, the reading glass 12 returns to the home position, and the guide sheet 30 pivots up (see FIG. 7c). In this way, the foreign matters E are removed from the reading position A.

Cleaning of the Reverse Side of the Reading Glass; See FIG. 8

Figure 8:
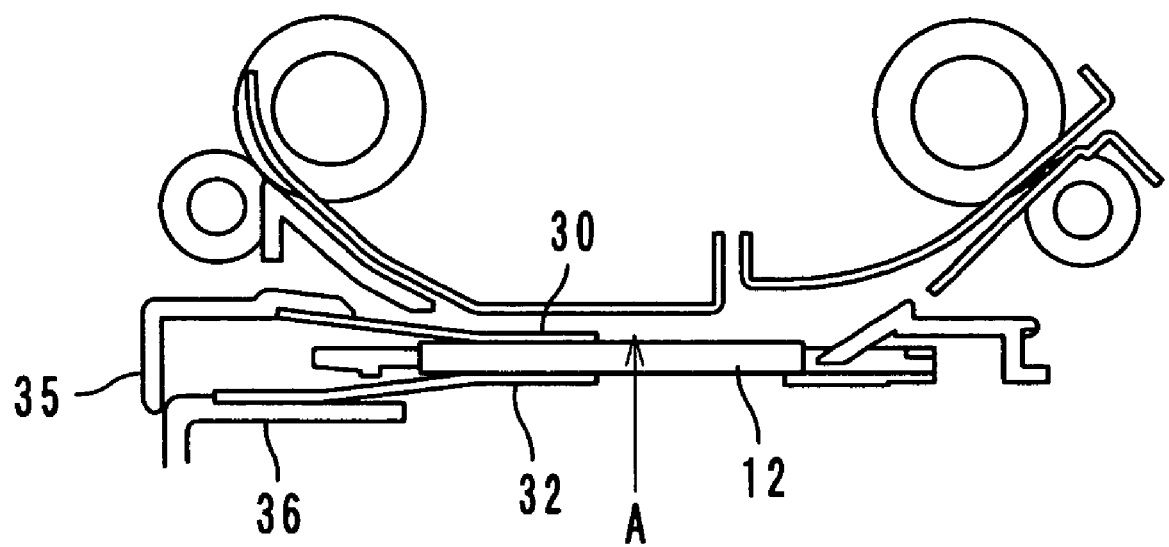
FIG. 8 is a sectional view showing a case in which the reverse side of the reading glass can be also cleaned.

As FIG. 8 shows, a cleaning sheet 32 may be provided also for the reverse side of the reading glass 12. The cleaning sheet 32 is, like the guide sheet 30, made of a material with a low sliding resistance and is fixed to a mounting plate 36. With the reciprocating motion of the reading glass 12 by the distance x2, the sheet 32 cleans foreign matters away from the reverse side of the reading glass 12. A structure is possible wherein only the reverse side of the reading glass 12 is cleaned.

Control of Cleaning of the Reading Glass

Next, control of the reciprocating motion of the reading glass 12 to remove foreign matters from the reading position A is described. In a structure wherein the guide sheet 30 is reciprocated instead of the reading glass 12 also, the control is carried out at the same timing.

Figure 9A:
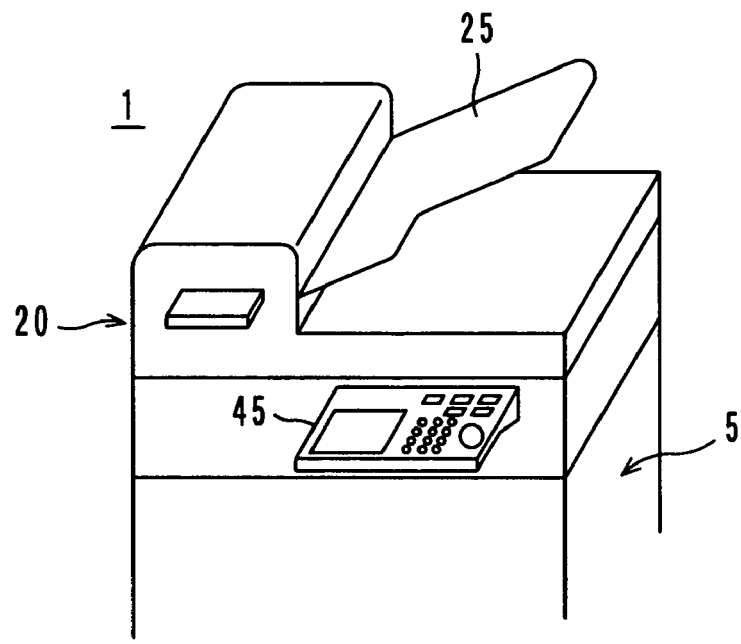
FIGS. 9a and 9b are perspective views showing the appearance of the image reading apparatus, FIG. 9a showing a state in which an automatic document feeder is closed down and FIG. 9b showing a state in which the automatic document feeder is opened up.
Figure 9B:
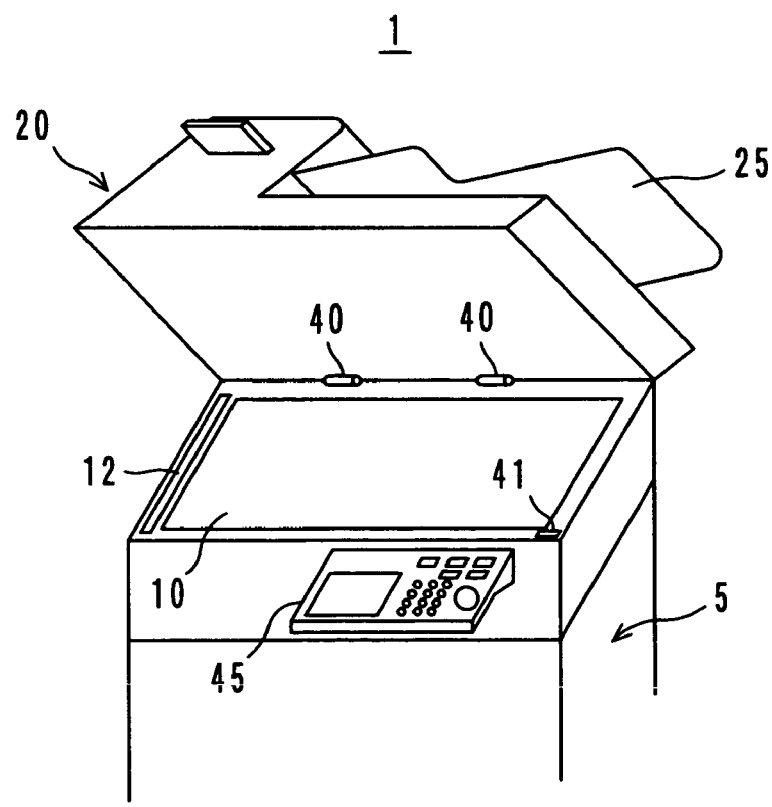

FIGS. 9a and 9b show the appearance of the image reading apparatus 1. The image reading apparatus 1 is set on a digital copying machine 5. The automatic document feeder 20 pivots on a rear side 40 and can be set in a closed position to cover the platen glass 10 and the reading glass 12 (see FIG. 9a) and in an open position (see FIG. 9b). The pivot of the automatic document feeder 20 is carried out manually, and a sensor 41 for detecting the automatic document feeder 20 be in the open/closed position is provided. In the front side of the image reading apparatus 1, an operation/display panel 45 for input of a job is provided. In the panel 45, a reading start (print start) button, a ten-key for inputting the number of copies, etc. are provided, and various kinds of job mode setting pictures are displayed. The "job modes" mean combinations of single-side reading or double-side reading with single-side copying or double-side copying, magnification ratio and various kinds of finishing processes such as sorting, stapling, etc.

FIG. 10 shows the general structure of a control section. The central element of the control section is a CPU 60, and a ROM 61 stored with programs and a RAM 62 temporarily stored with parameters are provided. An image forming process control section 64, an image reading process control section 65, a read image processing section 63 for processing an image picked up by the image pick-up section (CCD) 58, etc. are connected to the CPU 60. Also, the CPU 60 receives detection signals from the sensor 41 for detecting the automatic document-feeder 20 be in the open/closed position, a sensor 42 for detecting the reading glass 12 be in the home position, a sensor 43 for detecting a document on the tray 25, etc.

Figure 11:
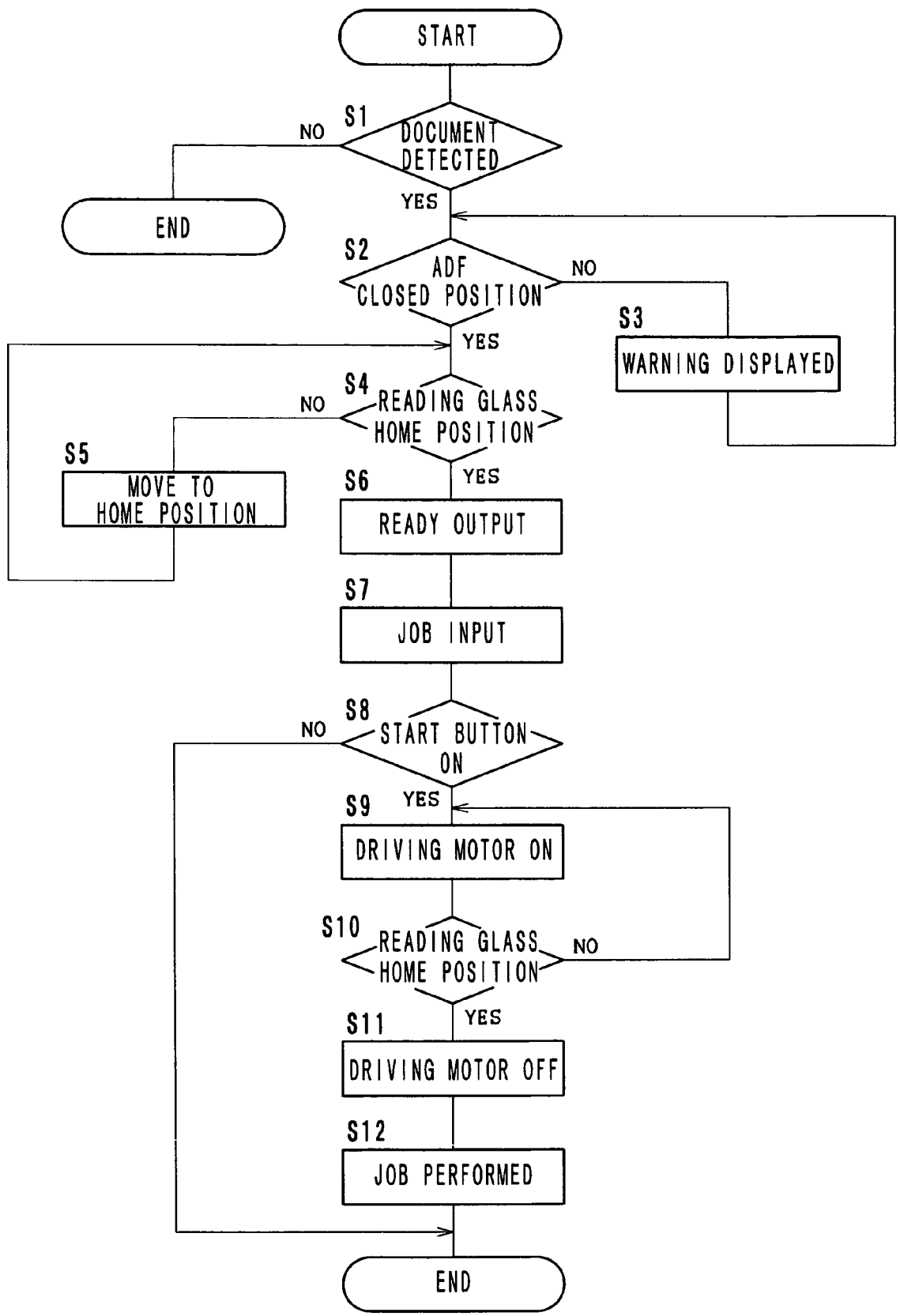
FIG. 11 is a flowchart showing a first exemplary control procedure for performing cleaning of the reading glass.

First Exemplary Control Procedure; See FIG. 11

First, when a document is detected being on the tray 25 ("YES" at step S1), it is checked at step S2 whether the automatic document feeder 20 is in the closed position. If the automatic document feeder 20 is open, a warning to close the automatic document feeder 20 is displayed on the panel 45 at step S3. If the automatic document feeder 20 is in the closed position, it is checked at step S4 whether the reading glass 12 is in the home position. If the reading glass 12 is not in the home position, the driving motor 17 is turned on at step S5 to return the reading glass 12 to the home position. When the reading glass 12 is set in the home position, a signal READY is output at step S6 to indicate that preparation for image reading has been completed.

Thereafter, a job is input at step S7, and when a print start button is turned on ("YES" at step S8), the driving motor 17 is turned on at step S9. Thereby, the reading glass 12 reciprocates, and when the reading glass 12 is returned to its home position ("YES" at step S10), the driving motor 17 is turned off at step S11. In this way, the reading glass 12 makes one reciprocating motion, and foreign matters on the reading glass 12 are removed from the reading position A. Then, at step S12, document feeding, image reading, printing are carried out in accordance with the content of the job.

According to the first exemplary control procedure, only when the automatic document feeder 20 is in the closed position, the reading glass 12 is moved for cleaning. Thus, the possibility of breakage of the reading glass 12 is minimized. Also, since the reading glass 12 is cleaned immediately before the start of a job, image reading is always carried out while the reading glass 12 is clean.

Figure 12:
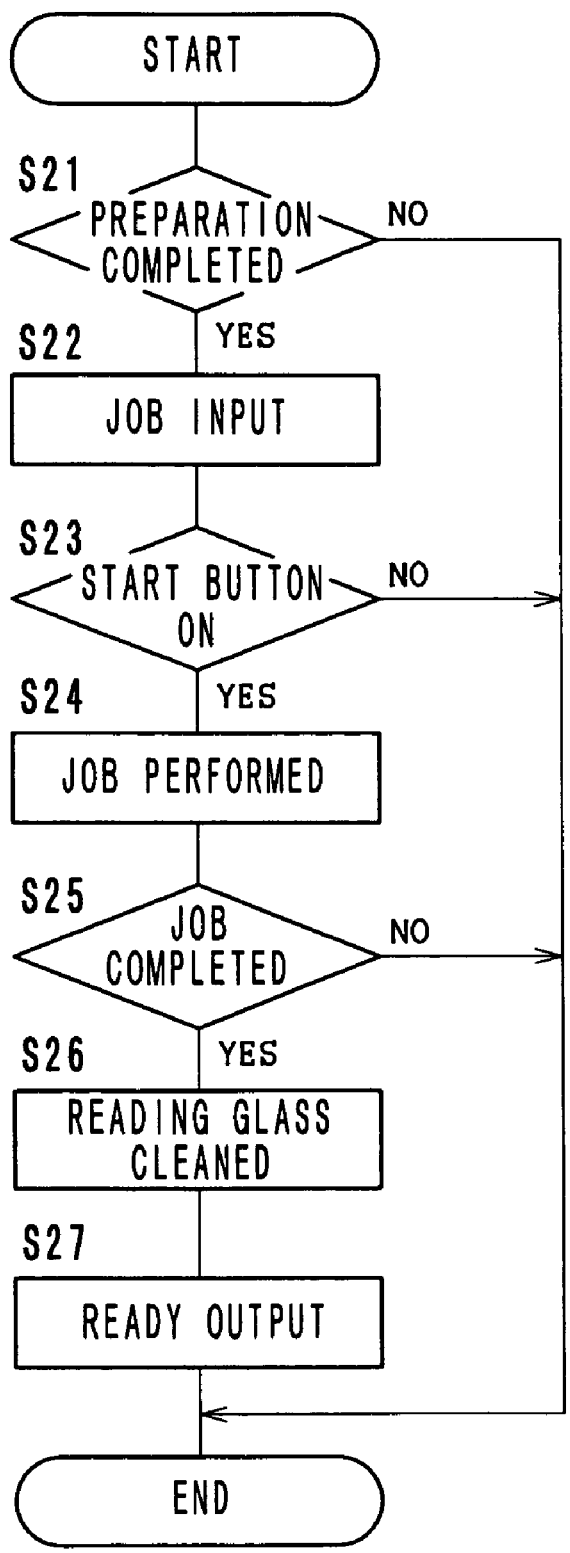
FIG. 12 is a flowchart showing a second exemplary control procedure for performing cleaning of the reading glass.

Second Exemplary Control Procedure; See FIG. 12

According to a second exemplary control procedure, the reading glass 12 is cleaned after completion of a job. After completion of preparatory motions of the image reading apparatus 1 and the copying machine 5 ("YES" at step S21), a job is input at step S22. Thereafter, when the print start button is turned on ("YES" at step S23), the job is carried out at step S24. Then, on completion of the job ("YES" at step S25), the reading glass 12 is cleaned at step S26 (see steps S9, S10 and S11 in FIG. 11), and the signal READY is output at step S27. The job carried out at step S24 depends on the content input at step S22.

Figure 13:
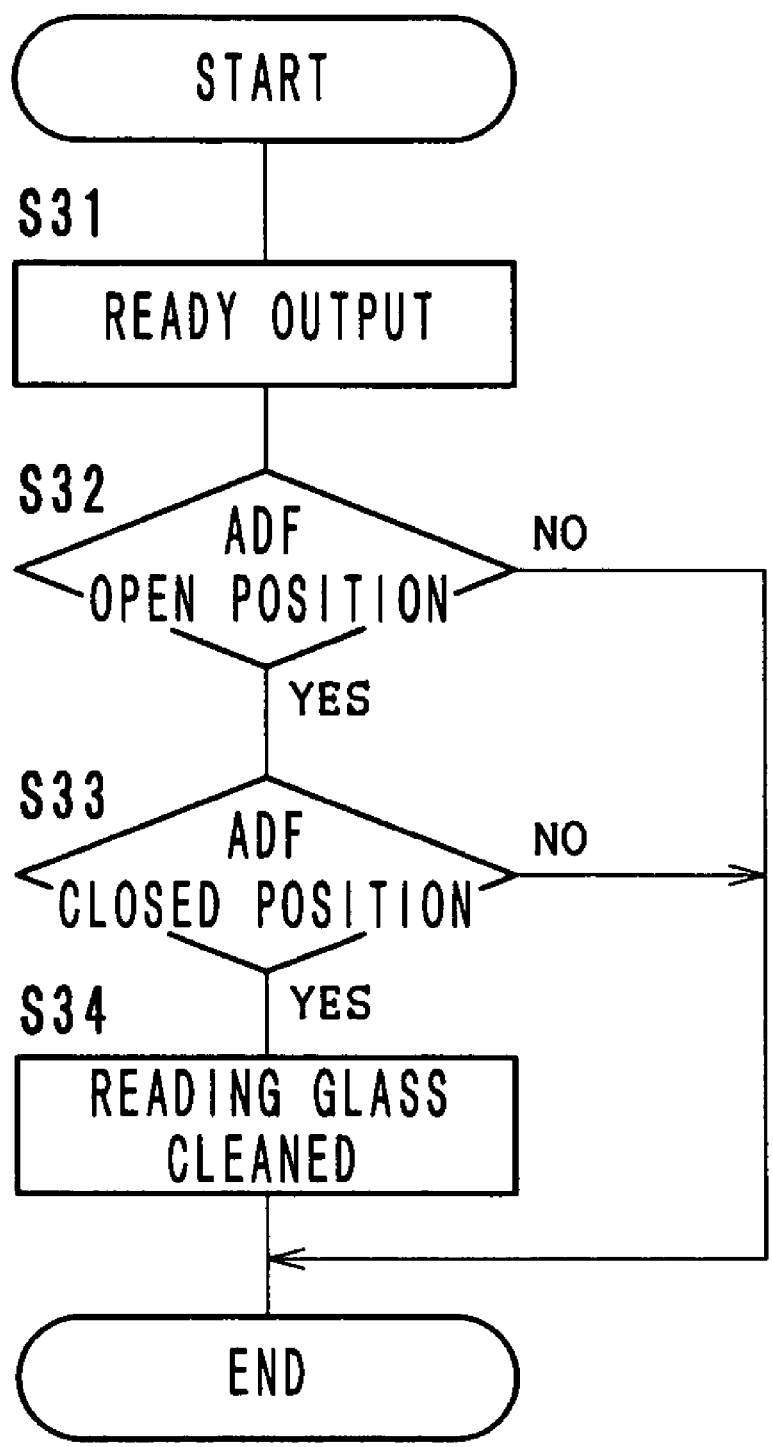
FIG. 13 is a flowchart showing a third exemplary control procedure for performing cleaning of the reading glass.

Third Exemplary Control Procedure; See FIG. 13

According to a third exemplary control procedure, when the automatic document feeder 20 is moved from the open position to the closed position, the reading glass 12 is cleaned. After detection of the signal READY at step S31, when the automatic document feeder 20 is detected being in the open position ("YES" at step S32) and further when the automatic document feeder 20 is detected to come to the closed position ("YES" at step S33), the reading glass 12 is cleaned at step S34 (see steps S9, S10 and S11 in FIG. 11).

When the automatic document feeder 20 is opened, dust in the air may adhere to the reading glass 12, and/or the user may touch the reading glass 12 by hand whereby dirt may adhere to the reading glass 12. According to the third exemplary control procedure, the dust and/or the dirt can be removed from the reading glass 12.

Figure 14:
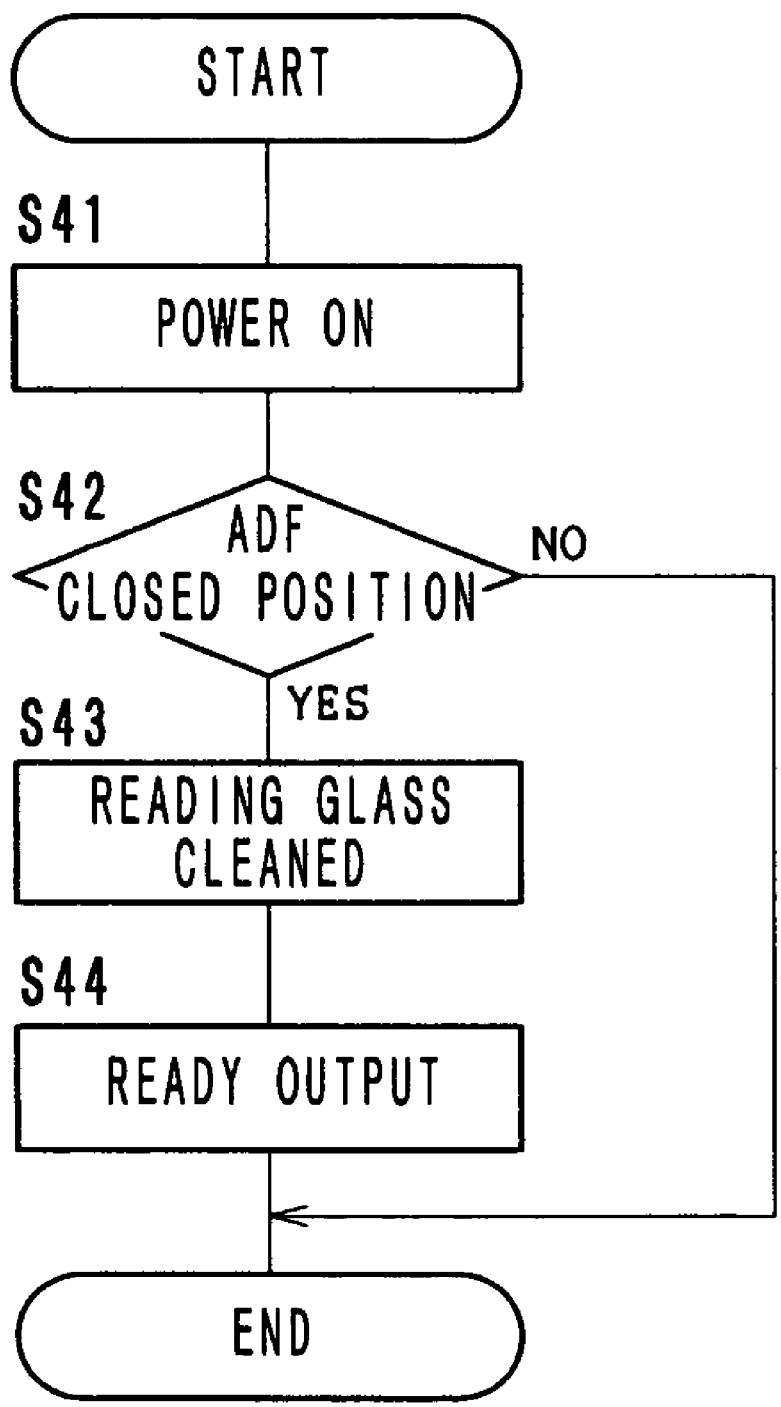
FIG. 14 is a flowchart showing a fourth exemplary control procedure for performing cleaning of the reading glass.

Fourth Exemplary Control Procedure; See FIG. 14

According to a fourth exemplary control procedure, when the power is switched on, the reading glass 12 is cleaned. When the power is turned on at step S41, the automatic document feeder 20 is checked at step S42 whether to be in the closed position. When the automatic document feeder 20 is in the closed position, the reading glass 12 is cleaned at step S43 (see steps S9, S10 and S11 in FIG. 11), and the signal READY is output at step S44. While the power is off, it is impossible to check whether the automatic document feeder 20 is in the closed position or in the open position. Therefore, when the power is turned on, the automatic document feeder 20 is checked whether to be in the closed position, and when the automatic document feeder 20 is detected being in the closed position, the reading glass 12 is cleaned.

Figure 15:
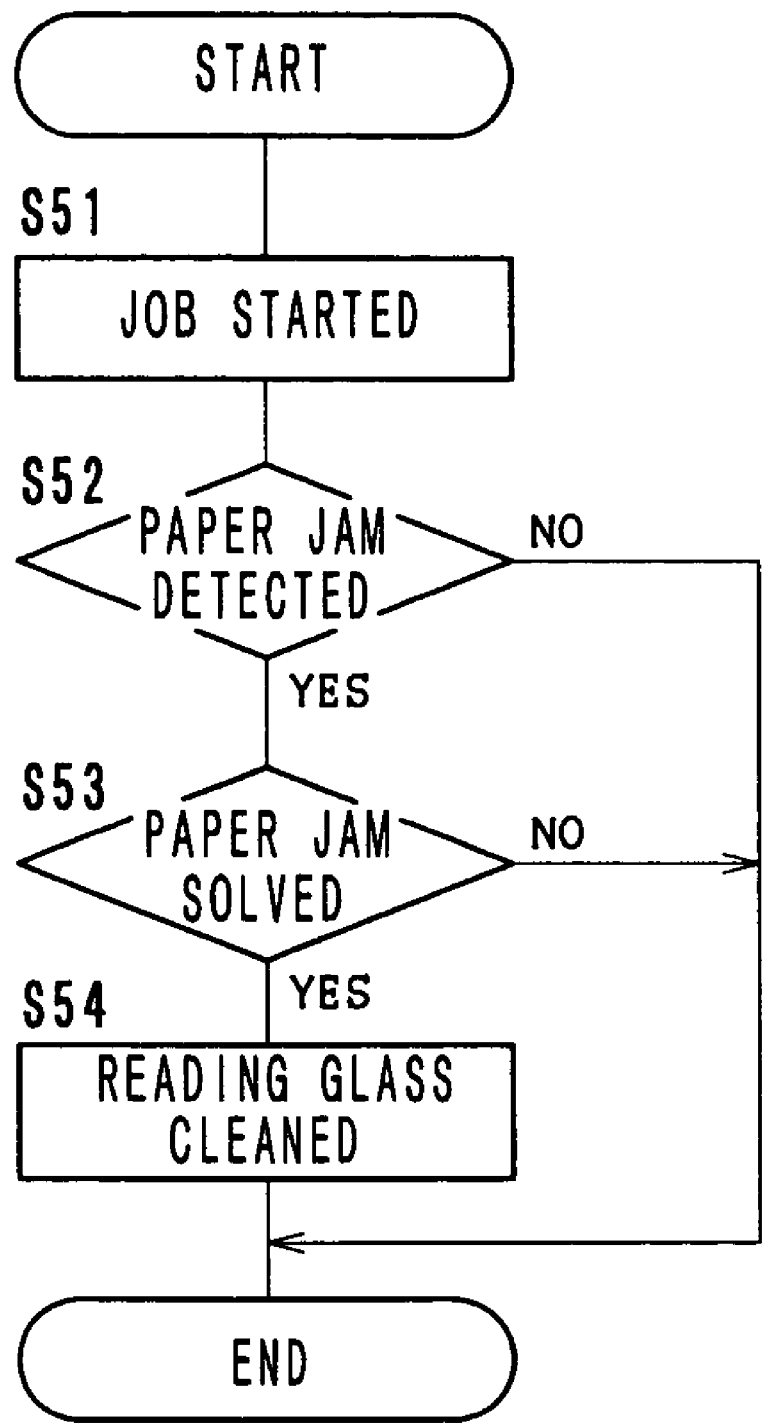
FIG. 15 is a flowchart showing a fifth exemplary control procedure for performing cleaning of the reading glass.

Fifth Exemplary Control Procedure; See FIG. 15

According to a fifth exemplary control procedure, after a paper jam in the automatic document feeder 20 is solved, the reading glass 12 is cleaned. During a job (at step S51), when a paper jam is detected ("YES" at step S52), the jammed paper is removed. When the removal of the jammed paper is completed ("YES" at step S53), the reading glass 12 is cleaned at step S54 (see steps S9, S10 and S11 in FIG. 11). The completion of the removal of the jammed paper can be detected, for example, by detecting opening of a frame of the automatic document feeder 20 for removal of the jammed paper and thereafter closing of the frame.

When a paper jam occurs, the jammed document has too much stress because of crash with the guide plates, and it is likely that paper powder and foreign matters fall from the document. Also, while removing the jammed paper, the user may touch the reading glass 12, whereby foreign matters may adhere to the reading glass 12. Therefore, it is effective to clean the reading glass 12 after completion of the removal of the jammed paper.

Figure 16:
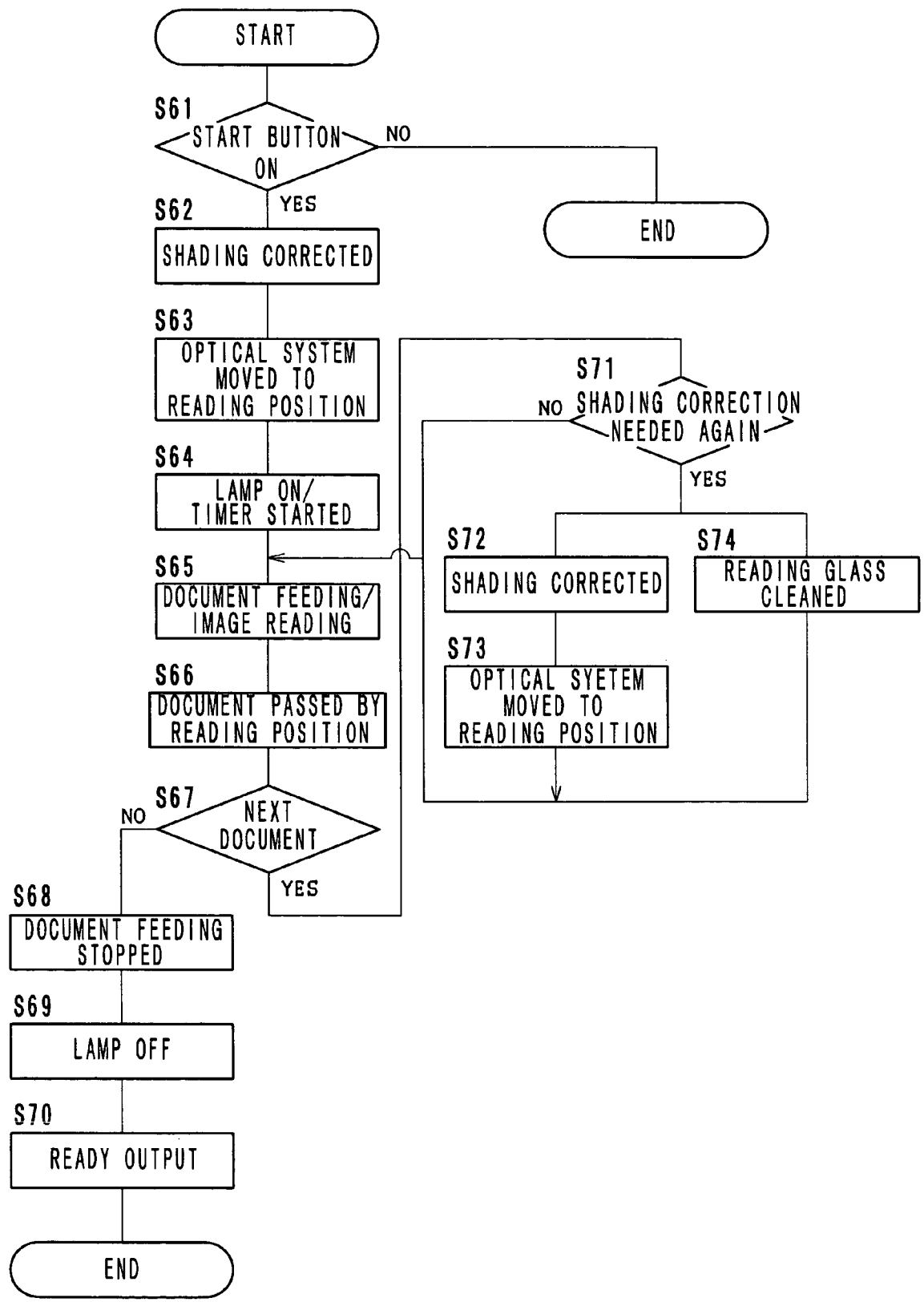
FIG. 16 is a flowchart showing a sixth exemplary control procedure for performing cleaning of the reading glass.

Sixth Exemplary Control Procedure; See FIG. 16

According to a sixth exemplary control procedure, while the image reading optical system 50 carries out shading correction, the reading glass 12 is cleaned. In order to read an image of a document, the image reading optical system 50 turns on the lamp 53 and reads the quantity of light reflected from the document with the image pick-up section (CCD) 58, and the read out density is processed into image data. In reading images of a plural number of documents, the lamp 53 is kept on for a long time. In this case, when the lamp 53 is turned on, the quantity of light emitted from the lamp 53 is the maximum, and thereafter, as the time passes, the quantity of light attenuates. Then, after a certain time passes, the quantity of light becomes stable. Therefore, compared with the initial state of turning on the lamp 53, the quantity of light entering to the image pick-up section (CCD) 58 is small, and the read-out images are judged as dark (high-density) images. In order to avoid this trouble, before the quantity of light emitted from the lamp 53 attenuates below a reference value, the white reference plate 11 is read again to carry out shading correction.

In carrying out shading correction, the reading optical system 50 is moved to a position immediately below the white reference plate 11, and document feeding and image reading are stopped temporarily. According to the sixth exemplary control procedure, even during a job, when shading correction is carried out, the reading glass 12 is cleaned. Thereby, foreign matters deposited on the reading glass 12 by serial feeding of documents can be removed.

When the print start button is turned on ("YES" at step S61), first, the image reading optical system 50 carries out shading correction at step S62. Thereafter, the reading optical system 50 is moved to the reading position A at step S63. Then, the lamp 53 is turned on, and simultaneously the timer is started at step S64.

Subsequently, document feeding and image reading are started at step S65, and when a document passes by the reading position A, it is checked at step S67 whether feeding of a next document is necessary. If there are no more documents to be fed, the document feeding is stopped at step S68, the lamp 53 is turned off at step S69, and the signal READY is output at step S70.

On the other hand, if there is one or more documents to be fed, at step S71, it is judged from the count value T of the timer whether shading correction is to be carried out again in order to comply with attenuation in the quantity of light emitted from the lamp 53. If it is time to carry out shading correction again, the reading optical system 50 is moved to the position immediately below the white reference plate 11, and shading correction is carried out at step S72. Thereafter, the reading optical system 50 is moved to the reading position A at step S73. Concurrently, the reading glass 12 is cleaned at step S74 (see steps S9, S10 and S11 in FIG. 11).

Seventh Exemplary Control Procedure; See FIGS. 17 and 18

According to a seventh exemplary control procedure, between the time when the trailing edge of a foregoing document passes by the reading position A and the time when the leading edge of a next document comes to the reading position A, the reading glass 12 is cleaned. In this case, the cleaning of the reading glass 12 may be started before the trailing edge of the foregoing document passes by the reading position A and may be started when a starting point of the trailing edge portion, which is not subjected to image reading, of the foregoing document comes to the reading position A.

Figure 17:
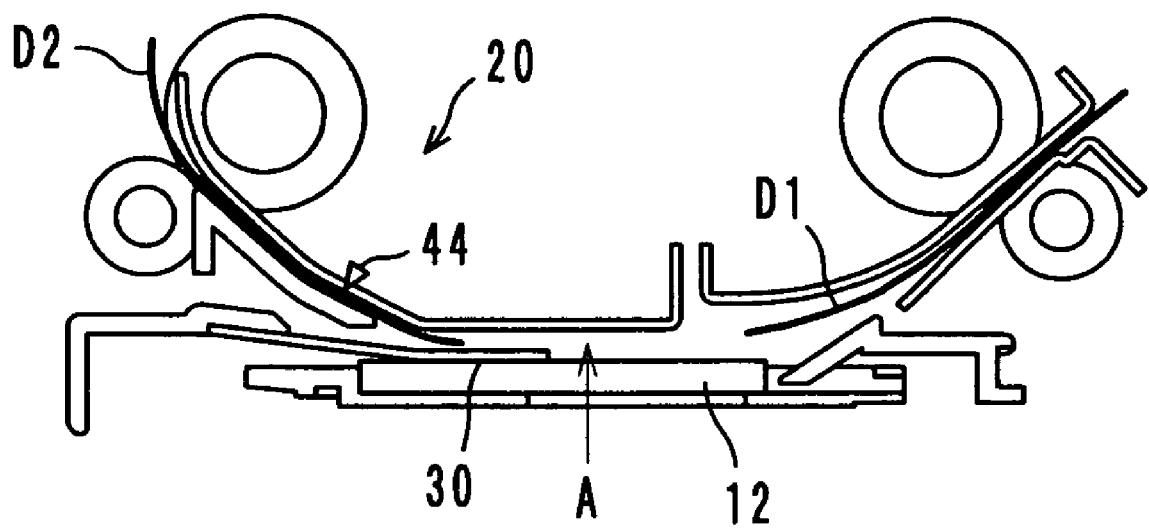
FIG. 17 is an illustration showing a state in which two documents are fed successively.

As FIG. 17 shows, the automatic document feeder 20 has a document sensor 44 in an upstream side of the reading position A. When a specified time has passed after the trailing edge of the foregoing document D1 was detected by the sensor 44, that is, when the trailing edge of the foregoing document D1 has passed by the reading position A, forward movement of the reading glass 12 is started, whereby cleaning of the reading glass 12 is started. Then, by the time when the leading edge of the next document D2 reaches the reading position A, backward movement of the reading glass 12 is completed, whereby the cleaning of the reading glass 12 is completed.

By the way, a document may have wrinkles in edge portions, and the edge portions may be at a skew. Therefore, it is impossible to accurately read the density and the linearity of the image in the edge portions. Also, even if the image in the edge portions can be read, it is impossible to reproduce the image finely up to the edge portions of a paper with the copying machine 5. Therefore, normally, the edge portions (areas with a width of approximately 5 mm from the respective edges) are not subjected to image reading. It is necessary to prohibit the reading glass 12 from moving during image reading. However, even if the reading glass 12 is moved while the trailing edge portion with a width of 5 mm is passing through the reading position A, it will have no influence on the image reading. Thus, in the seventh exemplary control procedure, the interval between documents in which the reading glass 12 can be moved for cleaning means the interval between the foregoing document and the next document including the trailing edge portion with a width of 5 mm, which is not subjected to image reading, of the foregoing document.

Figure 18:
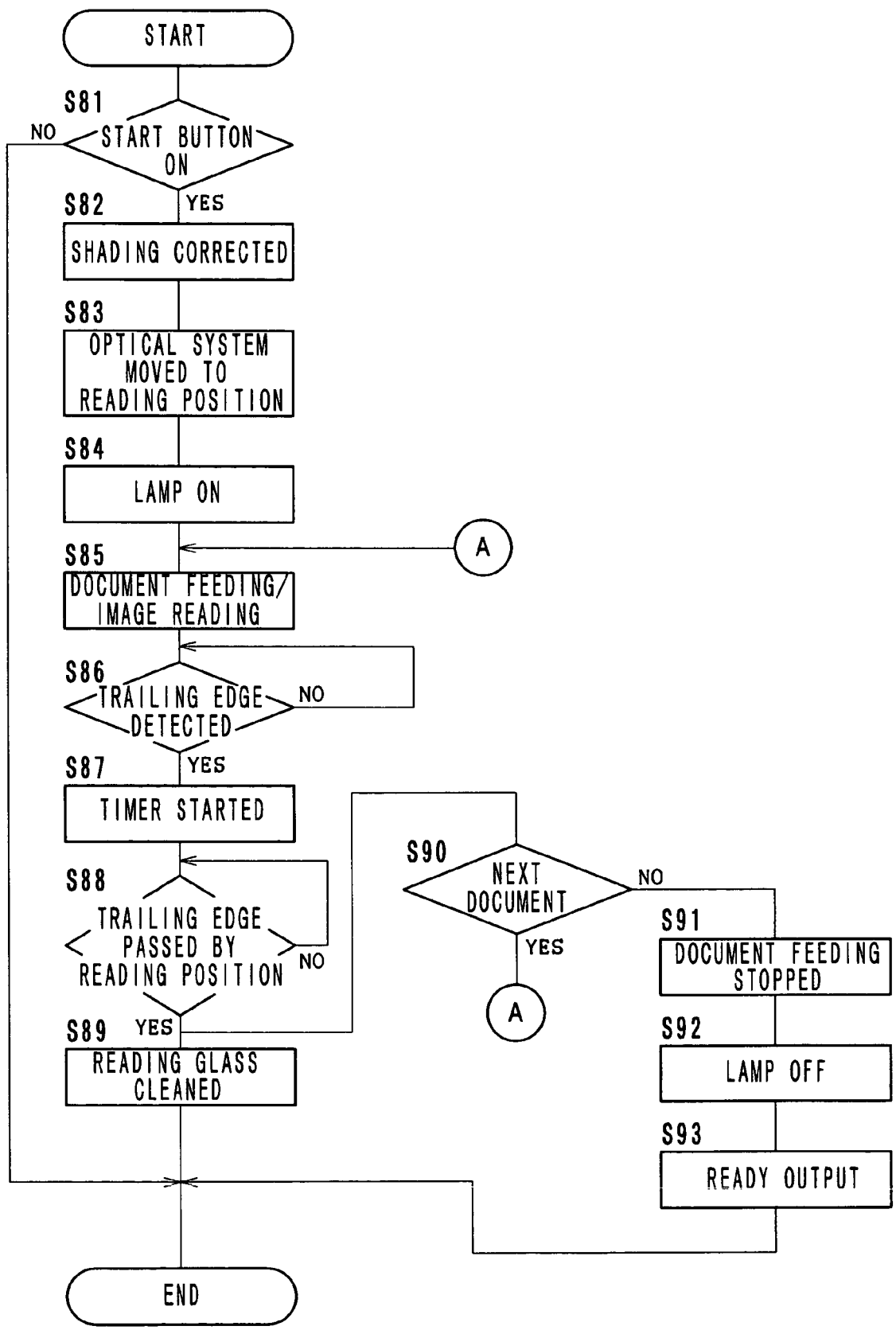
FIG. 18 is a flowchart showing a seventh exemplary control procedure for performing cleaning of the reading glass.

FIG. 18 shows the control procedure specifically. When a print start button is pushed ("YES" at step S81), first, shading correction is performed by the reading optical system 50 at step S82. Next, the reading optical system 50 is moved to the reading position A at step S83, and the lamp 53 is turned on at step S84.

Next, document feeding and image reading are started at step S85. When the trailing edge of a document is detected by the sensor 44 ("YES" at step S86), a timer is started at step S87. When it is judged from the count value of the timer that the trailing edge of the document or the point 5 mm before the trailing edge of the document in consideration for the portion not subjected to image reading comes to the reading position A ("YES" at step S88), cleaning of the reading glass 12 is performed at step S89 (see steps S9, S10 and S11 in FIG. 11).

During the cleaning of the reading glass A, it is checked at step S90 whether there is another document to be fed. If there are no more documents, the document feeding is stopped at step S91, the lamp 53 is turned off at step S92, and the signal READY is output at step S93. If there is another document to be fed, the procedure returns to step S85.

Another Image Reading Apparatus; See FIG. 19

Figure 19:
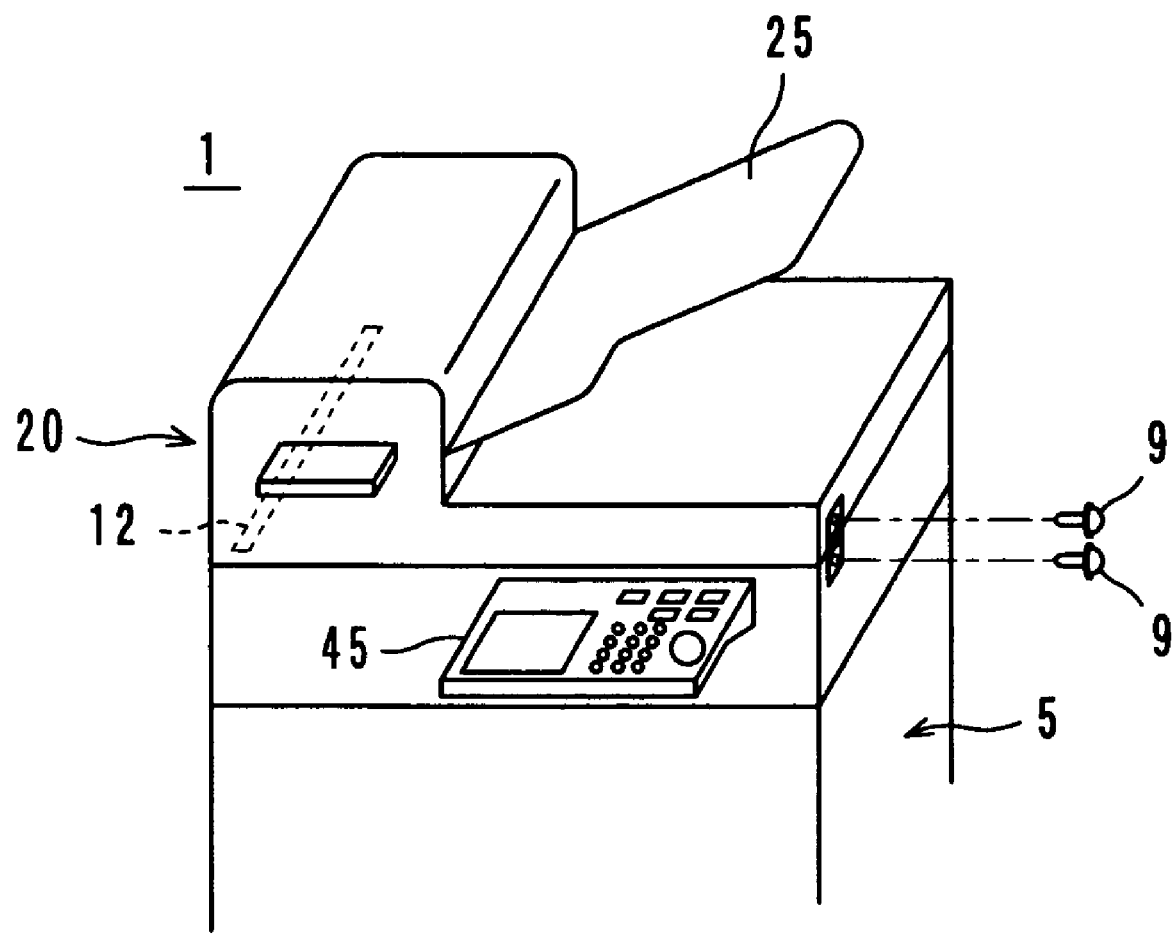
FIG. 19 is a perspective view showing the appearance of an image reading apparatus of another structure.

FIG. 19 shows an alternative structure for the image reading apparatus 1. In this structure, the automatic document feeder 20 is fixed to a main frame of the image reading apparatus 1 by a screw 9 so that pivot-up of the automatic document feeder 20, resulting in exposure of the reading glass 12, can be prohibited. This is to prevent users from moving the automatic document feeder 20 to the open position too easily. There is also a case in which the automatic document feeder 20 is structured integrally with the main frame of the image reading apparatus 1 so that the automatic document feeder 20 is essentially prohibited from pivoting up.

For such an image reading apparatus 1 of an open-motion-prohibited type, the open/close detection sensor 41 as shown in FIG. 9 is unnecessary, and it is also unnecessary to judge from the state of the sensor 41 whether cleaning of the reading glass 12 is possible.

Other Embodiments

The mechanism for feeding a document and the structure of the reading optical system can be designed arbitrarily.

Although the present invention has been described in connection with the preferred embodiments above, it is to be noted that various changes and modifications are possible to those who are skilled in the art.

What is claimed is:

1. An image reading apparatus comprising:
   an automatic document feeder for feeding documents one by one so that each document passes through a reading position;
   an image reading unit for reading an image of each of the documents traveling through the reading position;
   a transparent member provided between the document traveling through the reading position and the image reading unit;
   a document guide member, with a specified thickness, provided on the transparent member in an upstream side of the reading position; and
   a mechanism for reciprocating either the transparent member or the document guide member substantially in parallel to a document feeding direction while the document guide member is in contact with the transparent member;
   wherein if a downstream edge with respect to the document feeding direction of the document guide member is at a distance x1 from the reading position and if the document guide member or the transparent member is moved by a distance x2 relative to each other, the distances x1 and x2 are in relationship of $x1<x2$.

2. The image reading apparatus according to claim 1, wherein the transparent member and the document guide member are in contact with each other at least from a time when the travel distance x2 becomes equal to x1 to a time when a forward movement by the distance x2 completes.

3. The image reading apparatus according to claim 1, wherein if the downstream edge with respect to the document feeding direction of the document guide member is at a distance x3 from a downstream edge with respect to the document feeding direction of the transparent member, the distances x2 and x3 are in relationship of $x2 \geq x3$.

4. The image reading apparatus according to claim 1, wherein between the downstream edge of the document guide member and the transparent member, an area which prevents a traveling document from coming into contact with the transparent member is formed.

5. The image reading apparatus according to claim 1, further comprising a second mechanism for putting the document guide member into contact with and away from the transparent member.

6. The image reading apparatus according to claim 1, further comprising a sheet-like member which is structured integrally with the document guide member and which is in contact with a reverse side of the transparent member.

7. The image reading apparatus according to claim 1, wherein the downstream edge with respect to the document feeding direction of the document guide member is of a shape changing gradually in a plan view.

8. The image reading apparatus according to claim 1, further comprising:
   an input member for inputting a job to be performed by the image reading unit;
   a sensor for detecting that the automatic document feeder is in a closed position to cover the transparent member; and
   a control section for actuating the mechanism to move either the transparent member or the document guide member while the sensor detects that the automatic document feeder is in the closed position.

9. The image reading apparatus according to claim 8, wherein the control section actuates the mechanism to move either the transparent member or the document guide member before start of an input job.

10. The image reading apparatus according to claim 8, wherein the control section actuates the mechanism to move either the transparent member or the document guide member after completion of an input job.

11. The image reading apparatus according to claim 8, wherein the control section actuates the mechanism to move either the transparent member or the document guide member when the sensor detects that the automatic document feeder comes from an open position to uncover the transparent member to the closed position.

12. The image reading apparatus according to claim 8, wherein the control section actuates the mechanism to move either the transparent member or the document guide member when a power switch of the image reading apparatus is turned on.

13. The image reading apparatus according to claim 8, wherein the control section actuates the mechanism to move either the transparent member or the document guide member when a paper jam in the automatic document feeder which has been detected after start of an input job is solved.

14. The image reading apparatus according to claim 8, wherein the control section actuates the mechanism to move either the transparent member or the document guide member while the image reading unit is making shading correction after start of an input job.

15. The image reading apparatus according to claim 8, wherein the control section actuates the mechanism to move either the transparent member or the document guide member between a time when a trailing portion of a foregoing document passes by the reading position and a time when a leading portion of a next document comes to the reading position.

16. The image reading apparatus according to claim 15, wherein the control section starts actuating the mechanism to move either the transparent member or the document guide member before a trailing edge of the foregoing document passes by the reading position.

17. The image reading apparatus according to claim 16, the control section starts actuating the mechanism to move either the transparent member or the document guide member when a starting point of the trailing edge portion, which is not subjected to image reading, of the foregoing document comes to the reading position.

* * * * *